US008674556B2

(12) United States Patent
Tinaphong et al.

(10) Patent No.: US 8,674,556 B2
(45) Date of Patent: Mar. 18, 2014

(54) AUTOMATIC VARIABLE POWER OUTLET FOR ENERGY SAVING POWER SOURCE

(75) Inventors: Prapan Paul Tinaphong, Westfield, IN (US); Henry D. Caskey, Cicero, IN (US); Louis E. Lenzi, Carmel, IN (US); David A. Benedetti, Carmel, IN (US); Eric M. Michielutti, Carmel, IN (US); James K. Rinehart, Indianapolis, IN (US)

(73) Assignee: Audiovox Corporation, Hauppauge, NY (US)

( * ) Notice: Subject to any disclaimer, the term of this patent is extended or adjusted under 35 U.S.C. 154(b) by 561 days.

(21) Appl. No.: 12/924,871

(22) Filed: Oct. 7, 2010

(65) Prior Publication Data

US 2011/0169342 A1    Jul. 14, 2011

Related U.S. Application Data

(60) Provisional application No. 61/278,565, filed on Oct. 8, 2009.

(51) Int. Cl.
*H02J 3/12* (2006.01)

(52) U.S. Cl.
USPC .......................................... 307/126; 307/38

(58) Field of Classification Search
USPC .................................................. 307/38, 126
See application file for complete search history.

(56) References Cited

U.S. PATENT DOCUMENTS

| | | | | |
|---|---|---|---|---|
| 5,477,279 | A * | 12/1995 | Chang | 348/730 |
| 5,847,543 | A * | 12/1998 | Carroll | 320/125 |
| 5,920,466 | A * | 7/1999 | Hirahara | 363/21.02 |
| 6,154,374 | A * | 11/2000 | Uejima et al. | 363/16 |
| 6,430,062 | B1 * | 8/2002 | Shin | 363/21.01 |
| 6,462,437 | B1 * | 10/2002 | Marmaropoulos et al. | 307/125 |
| 6,677,734 | B2 * | 1/2004 | Rothleitner et al. | 323/259 |
| 6,909,621 | B2 * | 6/2005 | Lee | 363/81 |
| 7,072,189 | B2 * | 7/2006 | Kim et al. | 363/16 |
| 7,363,522 | B2 * | 4/2008 | Prosperi | 713/300 |
| 7,380,142 | B2 * | 5/2008 | Lee et al. | 713/300 |
| 7,516,343 | B2 * | 4/2009 | Bhogal et al. | 713/320 |
| 7,635,284 | B1 * | 12/2009 | Nemir et al. | 439/646 |
| 7,800,251 | B2 * | 9/2010 | Hodges et al. | 307/126 |
| 7,843,081 | B2 * | 11/2010 | Lim | 307/39 |
| 7,894,219 | B2 * | 2/2011 | Zong et al. | 363/49 |
| 7,944,086 | B2 * | 5/2011 | Hodges et al. | 307/31 |
| 8,143,748 | B2 * | 3/2012 | Ochi | 307/115 |

(Continued)

OTHER PUBLICATIONS

Notification of Transmittal of the International Search Report and the Written Opinion of the International Searching Authority, or the Declaration, in English, dated Dec. 21, 2010, the International Search Report, in English, dated Dec. 21, 2010, and the Written Opinion of the International Searching Authority, in English, dated Dec. 21, 2010.

*Primary Examiner* — Adi Amrany

(74) *Attorney, Agent, or Firm* — Gerald T. Bodner

(57) ABSTRACT

A variable power device in a form of a power strip includes a plurality of power outlets for powering electrical devices connected thereto. A current sensing circuit is electrically coupled to each power outlet and senses current flowing through the power outlet and drawn by an electrical device connected to the outlet. A power control circuit selectively provides one of a standby mode power signal and an active mode power signal to a respective power outlet in response to the feedback signal from the current sensing circuit associated with the power outlet.

9 Claims, 3 Drawing Sheets

(56) References Cited

U.S. PATENT DOCUMENTS

| | | | |
|---|---|---|---|
| 8,174,148 B2* | 5/2012 | Crucs | 307/32 |
| 8,400,013 B2* | 3/2013 | Single | 307/42 |
| 2003/0042796 A1 | 3/2003 | Siu | 307/39 |
| 2006/0186867 A1* | 8/2006 | Kataoka | 323/282 |
| 2006/0273663 A1* | 12/2006 | Emalfarb | 307/126 |
| 2008/0130340 A1 | 6/2008 | Unger et al. | 363/146 |
| 2008/0164768 A1 | 7/2008 | Litwack | 307/116 |
| 2008/0309164 A1* | 12/2008 | Lim | 307/39 |
| 2009/0091192 A1* | 4/2009 | Robertson et al. | 307/125 |
| 2009/0102294 A1* | 4/2009 | Hodges et al. | 307/126 |
| 2009/0146494 A1* | 6/2009 | Mori et al. | 307/38 |
| 2009/0215319 A1* | 8/2009 | Gandhi | 439/654 |
| 2010/0133905 A1* | 6/2010 | Chang et al. | 307/31 |
| 2010/0283323 A1* | 11/2010 | Single | 307/38 |
| 2011/0019445 A1* | 1/2011 | Wu et al. | 363/78 |
| 2011/0150431 A1* | 6/2011 | Klappert | 386/296 |

* cited by examiner

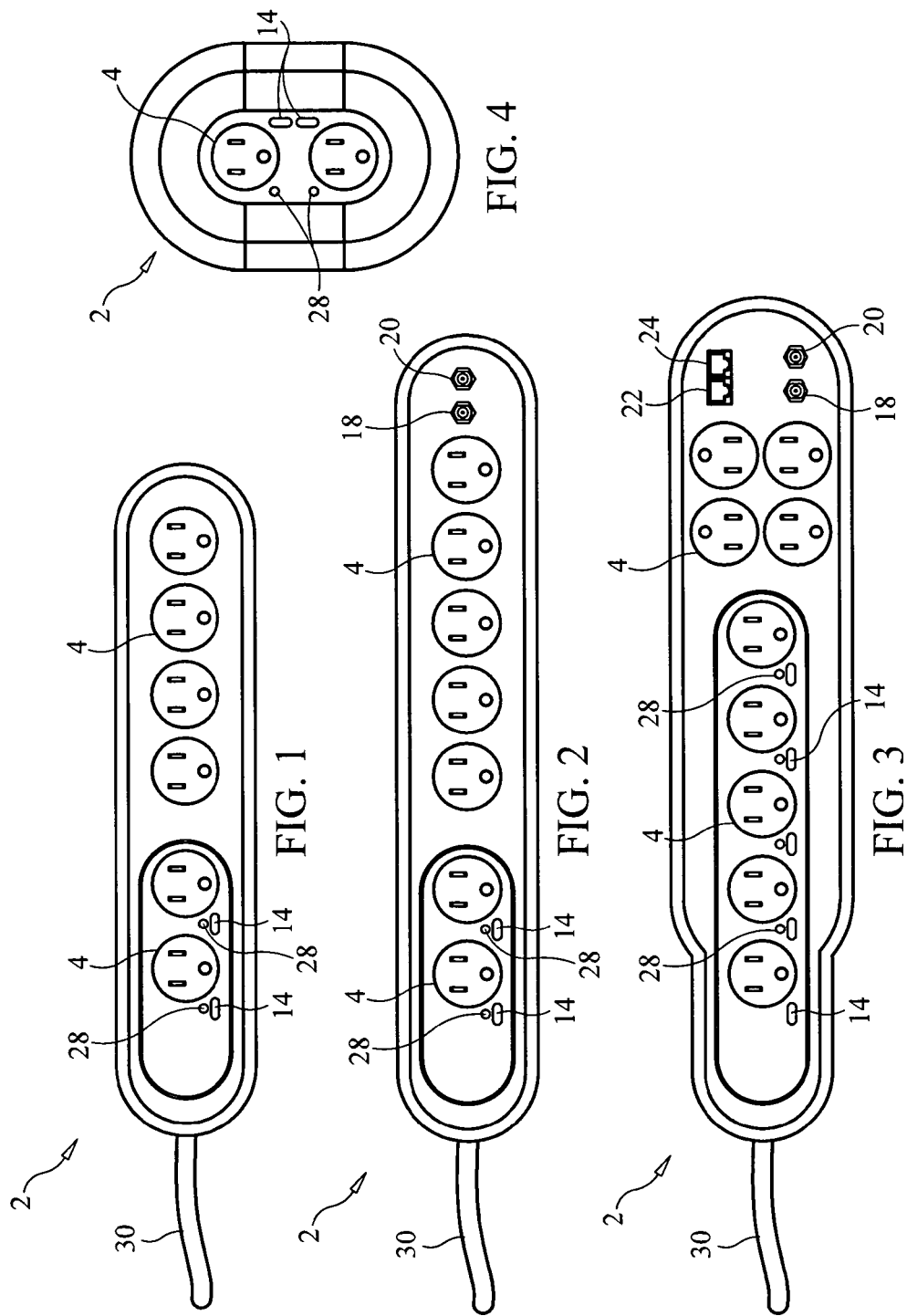

AUTOMATIC VARIABLE POWER OUTLET FOR ENERGY SAVING POWER SOURCE

CROSS-REFERENCE TO RELATED APPLICATION

This application is related to U.S. Provisional Application Ser. No. 61/278,565, which was filed on Oct. 8, 2009, and is entitled "Automatic Variable Power Outlet for Energy Saving Power Source", the disclosure of which is hereby incorporated by reference and on which priority is hereby claimed.

BACKGROUND OF THE INVENTION

1. Field of the Invention

The present invention relates to power outlets and power surge strips for providing power to electrical devices, such as televisions, digital video recorders and players, audio amplifiers, video cassette, appliances (such as refrigerators), recorders and AC/DC adapters.

2. Description of the Prior Art

There is so much electrical power energy that is being wasted each day in consumer's homes, especially those homes which have old or latent electrical appliances and electronic devices. Many consumers are not aware that they can decrease the electrical consumption of these appliances and devices by simply unplugging these appliances and devices from the household wall outlet or power strip when the appliances or devices are not in use. However, it is impractical and inconvenient for users to unplug these electronic devices and appliances every day after use, and then have to go through the initial setup procedure again when these appliances and devices are re-powered.

OBJECTS AND SUMMARY OF THE INVENTION

It is an object of the present invention to provide a power outlet for powering electrical appliances and electronic devices which automatically reduces the AC line voltage to the minimum level which still allows these appliances and devices to function properly in a standby mode.

It is a further object of the present invention to provide a power outlet for providing power to electrical appliances and electronic devices, which power outlet will automatically increase the AC line voltage provided to the appliance or device to the normal 115/120 volt level once these appliances and devices are powered up from their standby mode and start to draw more current for normal operation requirement.

In accordance with one form of the present invention, an automatic variable power device for use as an energy saving power source includes one or more power outlets for providing power to one or more electrical appliances and electronic devices, a microprocessor or main control circuit which can determine by sensing the amount of current consumption whether the appliance or device is in a "standby" mode and which can reduce the voltage as well as the phase and duty cycle provided to the appliance or device when it is in such standby mode, and a plurality of current sensing circuits which sense the current drawn by the appliance or device connected to each of the power outlets and which provide a feedback signal to the microprocessor or main control circuit so that the microprocessor or the main control circuit can increase or decrease the voltage supplied to a particular power outlet and to the appliance or device connected thereto in accordance with whether the appliance or device is in a normal powered mode or in a standby mode, respectively.

These and other objects, features and advantages of the present invention will be apparent from the following detailed description of illustrative embodiments thereof, which is to be read in connection with the accompanying drawings.

BRIEF DESCRIPTION OF THE DRAWINGS

FIGS. 1-4 are front views of various embodiments of an automatic variable power device in a form of a power strip constructed in accordance with the present invention.

DETAILED DESCRIPTION OF THE PREFERRED EMBODIMENTS

Figure 5:
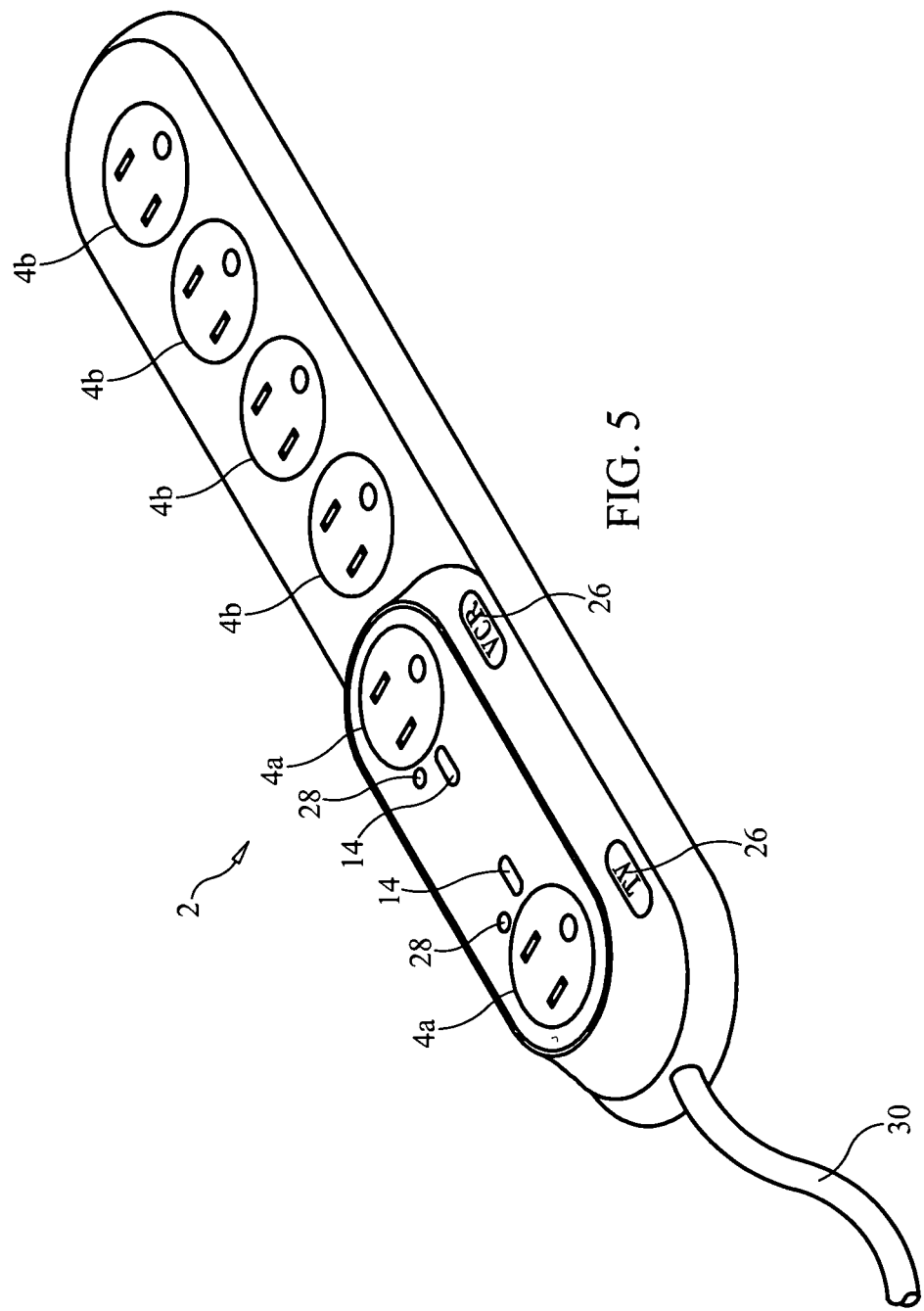
FIG. 5 is a perspective view of the embodiment shown in FIG. 1 of the automatic variable power device of the present invention.

As shown in the drawings, a power outlet strip, or surge strip (with surge protection capabilities) 2, formed in accordance with the present invention, includes a plurality of power outlets 4. The electrical appliances and electronic devices will be plugged into a specific outlet 4 on the power strip 2 that is properly labeled and designated for a particular type of appliance or device, such as television, DVD, audio amplifier, VCR, AC/DC adapter and the like. This power strip 2 may be plugged into an AC wall outlet, and selectively provides power to each of the power outlets 4.

A preliminary experiment was conducted to measure the power consumption when electronic devices, such as a television, DVD, VCR and audio amplifier were turned off and in the standby mode, with their power cords still plugged into the AC outlets. The input voltage was intentionally reduced to 92 volts AC, while these devices were in a standby mode, and then the power consumption was measured for each device. This preliminary experiment demonstrated that most of the older and latent consumer electronic devices would take less power consumption in their standby mode if the input line voltage was reduced from the normal 115/120 volts AC to 92 volts AC. Some devices also showed a significant power consumption reduction of from 1.2 watts with 115 volts AC to 0.5 watts in standby mode with 92 volts AC.

Ninety-two (92) volts AC is preferably used in the present invention when the appliances or devices are in a standby mode, because this appears to be the minimum level before the electronic devices and appliances will go into the "brown out" state and their circuitry can be damaged below this voltage level.

In accordance with the present invention, the variable power outlet strip 2 addresses the energy wasted in devices when they are in the standby mode by automatically reducing the AC line voltage to the minimum level which still allows the devices to function properly in the standby mode. The AC line voltage will be automatically increased by the variable power outlet strip of the present invention back to the normal 115/120 volt AC level once those devices are "woken up" and start to draw more current in order to run through their start up sequence in the active mode.

The present invention includes an electronic circuit 8 having a main control circuit 9, a microprocessor 6 forming part of the main control circuit 9, and a plurality of current sensing circuits 10, each sensing circuit 10 being connected to a power outlet 4 on the power strip 2, to monitor the current consumption between the active mode and the standby mode of the electrical appliances and electronic devices connected to the power strip 2. In order to determine whether an electronic device is in an active mode or in a standby mode, the power outlet device 2 of the present invention can use one of several methods or techniques to differentiate between those conditions.

One method is to monitor the current consumption for each electronic device, and then compare this current consumption that is monitored with a preset power level (in watts) that is programmed within the microprocessor or a memory 12 associated therewith. Each electronic device will be plugged into a specific outlet 4 on the power strip 2 of the present invention that is properly labeled and designated for its type of device, such as TV, DVD, audio amplifier, VCR, AC/DC adapter and the like. The power consumption of a majority of these electronic devices, when they are in a standby mode, can be predetermined. The variable power strip 2 of the present invention may include an override or set switch 14, which can be activated by the user to bypass this variable power outlet feature at any time and let one or more of the power outlets 4 perform as a normal AC outlet (without the standby roll back in voltage).

Another method in accordance with the present invention is to have the power strip 2 of the present invention learn the power consumption behavior of each electronic device or electrical appliance connected thereto by using the microprocessor 6 to measure the low current consumption state to determine if the electronic device is in the off or standby mode, and store this measured current consumption value in the memory 12, and then record the average or high current consumption of the electronic device when the device is in the active mode, and store this high current consumption value in the memory 12. If the current consumption of the electronic device goes to zero, then the measurement allows the microprocessor 6 to determine that the device is completely unplugged from the power strip 2, power network or system of the present invention. By learning the minimum and maximum current consumption for each electronic device or electrical appliance connected to the power strip 2, the microprocessor 6 can automatically sense changes in current consumption and decide if the electronic devices are in the standby mode or active mode, and then adjust the voltage provided to the respective outlet 4 to which the electronic device is connected in accordance with the detected conditions of the device, by either maintaining the line voltage provided to the outlet 4 to which the electronic device is connected to 115/120 volts AC (when the device is in the active mode) or by reducing the line voltage to 92 volts AC (when the device goes into the standby mode).

FIGS. 1-5 illustrate various embodiments of an automatic variable power device in the form of a power strip 2, preferably with surge suppression capabilities, formed in accordance with the present invention. Each of the power strips 2 includes one or more variable power outlets 4a, and may include one or more fixed (non-variable) power outlets 4b.

More specifically, FIGS. 1 and 5 show a power strip 2 having two variable 120 volt AC power outlets 4a and four fixed (non-variable) 120 volt AC power outlets 4b. This power strip 2 may include a surge suppression circuit 16 within the interior of the power strip, which is preferably connected to each variable power outlet 4a and each fixed power outlet 4b.

FIG. 2 shows a power strip 2 having two variable 120 volt AC power outlets 4a and five fixed (non-variable) 120 volt AC power outlets 4b, as well as a satellite/cable input connector 18 and a satellite/cable output connector 20. A surge suppression circuit 16 within the interior of the power strip 2 is preferably connected to each variable power outlet 4a and each fixed power outlet 4b, as well as being connected to the satellite/cable input connector 18 to provide surge suppression for the signal on the satellite/cable output connector 20.

FIG. 3 shows a power strip 2 having four variable 120 volt AC power outlets 4a and four fixed (non-variable) 120 volt AC power outlets 4b, as well as a satellite/cable input connector 18 and a satellite/cable output connector 20, and an Ethernet input connector 22 and an Ethernet output connector 24. Preferably, a surge suppression circuit 16 is included within the interior of this power strip 2 and is connected to each variable power outlet 4a and each fixed power outlet 4b, as well as being connected to the satellite/cable input connector 18 and to the Ethernet input connector 22 to provide surge suppression for the signals on the satellite/cable output connector 22 and the Ethernet output connector 24.

FIG. 4 illustrates a power strip 2 which may be plugged into a 120 volt AC wall power receptacle. This wall-mounted unit 2 preferably includes two variable 120 volt AC power outlets 4a. This unit 2 also preferably includes a surge suppression circuit 16 within its interior, which is connected to each variable power outlet 4a.

A label (TV, VCR, etc.) 26 with an adhesive backing may be placed by the user of the power strip 2 next to one of the variable power outlets 4a to which a designated electrical device, such as a television or a video cassette recorder, is connected. If the user wishes to make use of the automatic variable power feature of the present invention for a particular power outlet 4 on the strip 2, he presses a "set" push button switch 14 situated on the front face of the power strip 2 adjacent or in proximity to the power outlet 4. The "set" push button switch 14 is connected to a microprocessor 6 of the electronic circuit 8 situated within the interior of the power strip 2 (see FIG. 6) so that the microprocessor 6 will know to conduct an operational routine to measure the power consumption, and more particularly, the current drawn by the electrical device (television, video cassette recorder or the like) connected to the particular variable power outlet 4a which is set by the user. If the user does not press the "set" push button switch 14, the microprocessor 6 will not vary the power on that particular power outlet 4 which is not set by the user, and the power outlet 4 will provide a fixed (non-variable) 120 volt AC power signal to the electrical device connected thereto. Alternatively, the power outlet 4 will automatically provide a variable voltage to an electrical device connected to it if the push button switch 14 associated with that outlet 4 is not pressed. Or, the power strip 2 may be provided with a single push button switch 14 which will either override the variable voltage feature or set the variable voltage feature for all or some of the power outlets 4 of the power strip 2.

After the user presses the "set" push button switch 14, the user switches the electrical device (television, video cassette recorder or the like) between an off state, a standby state, in which the electrical device is on but not in an operational mode (with some electrical devices, the off state may be the standby state), and an active state, in which the electrical device is operational (for example, the television is displaying a picture, or the video cassette recorder is playing a video cassette). The microprocessor 6 of the electronic circuit 8 within the power strip 2 will automatically measure the power consumption, and in particular, the current drawn by the electrical device in these various states (off, standby and active) and passing through the associated power outlet 4. The current drawn in each state by the particular device electrically connected to a designated variable power outlet 4a will be stored in a memory 12 of the electronic circuit 8 for a designated power outlet. A green LED (light emitting diode) 28 situated on the front face of the power strip 2 adjacent or in proximity to each variable power outlet 4a will be illuminated by the microprocessor 6 after the microprocessor 6 has completed its routine and had successfully sensed the power consumption or current drawn by the electrical device connected to the respective power outlet 4a for each state or mode the electrical device may be in.

Thus, the microprocessor 6 can sense, by the power consumption or the magnitude of current drawn by the electrical device, what state the electrical device is in (off, standby or active).

When the electrical device is in the "standby" state or mode, which is recognized by the microprocessor 6, the microprocessor 6 will decrease the voltage provided to the associated variable power outlet to, preferably, 92 volts AC. However, when the electrical device is being used and switched to the active state or mode, additional power consumption or, in particular, a greater magnitude of current drawn by the electrical device will be sensed by the electronic circuit 8, and this greater power consumption or greater magnitude of current will be compared by the microprocessor 6 to a threshold value of power consumption or current stored in the memory 12 of the electronic circuit 8 and associated with a particular variable power outlet 4a to which the electrical device is connected. The microprocessor 6 compares the greater power consumption or higher magnitude of current now being drawn by the electrical device against the standby power consumption or current threshold value stored in the memory 12, or another predetermined threshold which is stored in memory 12, and will determine that the electrical device is no longer in the standby state and is now in the active state. Under these conditions, the microprocessor 6 will cause the electronic circuit 8 to provide the full 120 volt AC power signal to the variable power outlet 4a of the power strip 2 to which the electrical device is connected.

When the electrical device again goes from an active state, in which it is operational, to a standby state or to an off state, the decrease in power consumption or, in particular, the lower magnitude of current drawn by the electrical device will now be sensed by the electronic circuit 8, and the microprocessor 6, in response to the sensed lower power consumption or decrease in magnitude in current drawn by the electrical device, will cause the electronic circuit 8 to provide a lower voltage, that is, preferably 92 volts AC, to the variable power outlet 4a to which the electrical device is connected, as a result of the comparison between the sensed power consumption or current drawn by the electrical device with a predetermined threshold level stored in the memory 12 of the electronic circuit 8.

Figure 6:
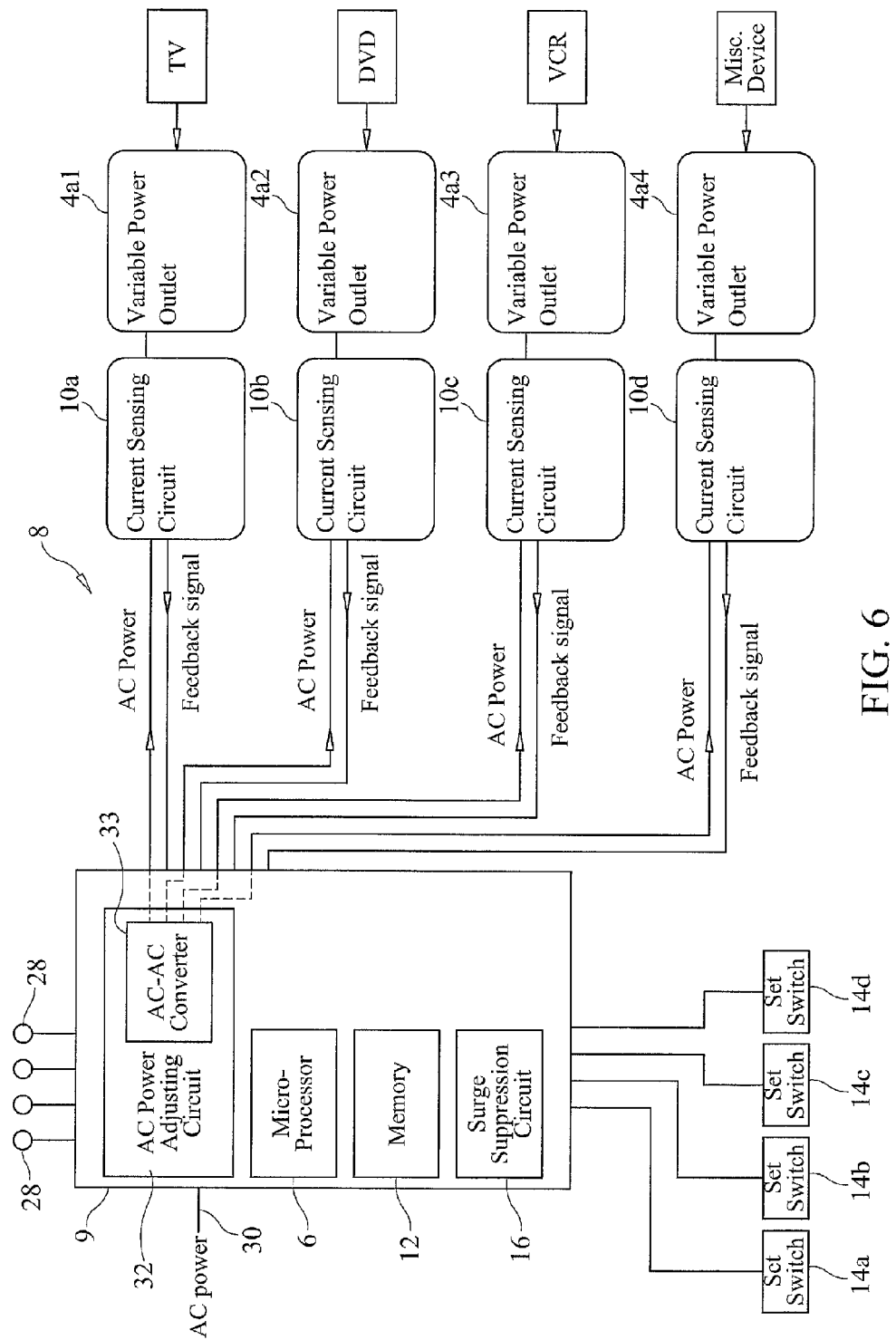
FIG. 6 is a block diagram of a circuit used in the variable power device of the present invention.

FIG. 6 illustrates one form of an electronic circuit 8 for use in the automatic variable power device of the present invention. A 120 volt AC power signal is provided on a power cord 30 to the automatic variable power device in the form of a power strip 2 (see FIGS. 1-3 and 5) or by the power strip or module having a plug which is receivable directly into a 120 volt AC wall receptacle (see FIG. 4). The AC power signal is provided to the main control circuit 9, which includes the microprocessor 6 and an AC power adjusting circuit 32 connected to the microprocessor. The AC power adjusting circuit 32 may be an AC-to-AC power converter 33, which selectively increases or decreases the power signal provided to the individual power outlets 4 on the power strip 2 in accordance with control signals provided by the microprocessor 6 to the AC power adjusting circuit 32. The electronic circuit 8 further includes a memory 12, such as a random access memory (RAM), which forms part of the main control circuit 9 and is electrically coupled to the microprocessor 6 thereof. Also, associated with each variable power outlet 4a on the power strip 2 is a push button "set" switch 14.

As shown in FIG. 6 of the drawings, and for exemplary purposes only to facilitate an understanding of the invention, there are four variable power outlets 4a, that is, a first variable power outlet 4a1, a second variable power outlet 4a2, a third variable power outlet 4a3 and a fourth variable power outlet 4a4. Accordingly, there are four set switches 14 associated with the four variable power outlets, that is, a first set switch 14a, a second set switch 14b, a third set switch 14c and a fourth set switch 14d. The set switches 14 are electrically connected to the main control circuit 9 of the electronic circuit 8 and, in particular, the microprocessor 6 thereof, to provide a signal from a user activated set switch 14 to the microprocessor 6 to signal the microprocessor that the user wishes to set the power signal provided on one of the outlets 4 of the power strip 2 to be either variable or fixed (non-variable).

The main control circuit 9 of the electronic circuit 8 of the power strip 2, and in particular, the AC power adjusting circuit 32 thereof, provides an AC power signal to the variable power outlets 14a to which an electrical device may be connected. For example, a television may be connected to the first variable power outlet 4a1, a DVD (digital video disk) player may be connected to the second variable power outlet 4a2, a video cassette recorder may be connected the third variable power outlet 4a3, and a miscellaneous device, such as a video game console, may be connected to the fourth variable power outlet 4a4.

The electronic circuit 8 of the automatic variable power device 2 of the present invention further includes one or more current sensing circuits 10. Each current sensing circuit 10 is electrically connected to a variable power outlet 4a and, more preferably, is connected in series between the main control circuit 9 and the variable power outlet 4a, and more particularly is connected in series with the AC power signal provided by the main control circuit 9 to the variable power outlet 4a. As shown in FIG. 6 of the drawings, and by way of example only, there are four current sensing circuits 10 in the electronic circuit of the power strip, that is, a first current sensing circuit 10a, a second current sensing circuit 10b, a third current sensing circuit 10c and a fourth current sensing circuit 10d. Each current sensing circuit 10 is connected to one of the variable power outlets, that is, the first variable power outlet 4a1, the second variable power outlet 4a2, the third variable power outlet 4a3 and the fourth variable power outlet 4a4.

In one form of the present invention, the current sensing circuit 10 may be a resistor situated in series with the AC power signal provided to a respective variable power outlet 4a, and the voltage drop across the resistor is provided as a feedback signal to the main control circuit 9 and, in particular, the microprocessor 6 thereof. The voltage across the resistor is, of course, indicative of the current drawn by the electrical device connected to the variable power outlet 4a associated with the current sensing circuit 10. Thus, the microprocessor 6 can determine from this feedback signal the current being drawn by the electrical device connected to the respective variable power outlet 4a, when the electrical device is in an off state, a standby state and an active state.

As mentioned previously, either predetermined thresholds are stored in the memory 12 electronically coupled to the microprocessor 6 and are used to determine whether the electrical device connected to a particular variable power outlet 4a is in a standby state or an active state, or the microprocessor 6 can determine proper thresholds to store in the memory 12 of the electronic circuit 8 by measuring the power consumed or the current drawn by an electrical device connected to a respective variable power outlet 4a by the feedback signals provided by the current sensing circuit 10 connected to the variable power outlet 4a when the electrical device is in an off state, a standby state and an active state.

Again, as mentioned previously, when the microprocessor 6 determines the power consumption or, in particular, the current drawn by the electrical device when the electrical device is in the various states, it will illuminate a green LED 28 associated with a particular variable power outlet 4a, to indicate to the user that an economy mode is enabled for that particular power outlet 4a. Thus, for the example shown in FIG. 6, there are four preferably green LEDs 28, each of which is individually illuminated and each of which is associated with one of the first variable power outlet 4a1, the second variable power outlet 4a2, the third variable power outlet 4a3 and the fourth variable power outlet 4a4.

The microprocessor 6 is responsive to the feedback signal from each of the current sensing circuits 10 and determines from the feedback signal a current threshold level for each variable power outlet 4a. In response to the feedback signal from a current sensing circuit 10 associated with a particular variable power outlet 4a, the microprocessor 6 causes the AC power adjusting circuit 32 to provide the active mode power signal to the power outlet 4a if the feedback signal corresponds to a current flowing through the power outlet that is greater than (or equal to or greater than) the current threshold level the microprocessor 6 stored in the memory 12. The active mode power signal provided to the power outlet 4a is preferably 120 volts AC. The microprocessor 6 further causes the AC power adjusting circuit 32 to provide the standby mode power signal to the power outlet 4a if the feedback signal corresponds to a current flowing through the power outlet 4a that is equal to or less than (or less than) the current threshold level stored in the memory 12. Preferably, the standby mode power signal provided to the power outlet 4a is equal to about 92 volts AC.

The variable power strip, network, system or wall-mounted variable power device of the present invention, in its various forms, is in conformance with the "green energy" concept adopted by many states and federal agencies. For example, in California, there is a law that regulates the power consumption of any new electronic devices sold in the state, where such devices must be in compliance with new energy saving standards that are controlled by the California Energy Commission, or CEC. However, energy consumption of the older or latent devices that still exist in most consumer's homes, which still consume an inordinate amount of electrical energy while they are in a standby mode, has never been addressed. The power consumption of these devices may be significantly reduced while in the standby mode by using the variable power outlet strip 2 of the present invention.

Although the variable power device of the present invention has been primarily described herein as being in the form of a power surge strip, such as shown in FIGS. 1-3 and 5, and a plug-in module, such as shown in FIG. 4, it should be realized that the variable power device may take on many different forms, or be incorporated into an electronic device, such as one that provides auxiliary power to another device, and such other forms are envisioned to be within the scope of the present invention.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A variable power device for providing electrical devices connected thereto with a variable power signal, which comprises:
   at least one power outlet, an electrical device being connectable to the at least one power outlet;
   at least one current sensing circuit, the at least one current sensing circuit being electrically coupled to the at least one power outlet and sensing current flowing through the at least one power outlet and drawn by an electrical device connected to the at least one power outlet when the electrical device is in at least a standby mode and an active mode, and generating a feedback signal in response to the current sensed flowing through the at least one power outlet; and
   a power control circuit electrically coupled to the at least one power outlet and selectively providing one of a standby mode power signal and an active mode power signal to the at least one power outlet in response to the feedback signal from the at least one current sensing circuit, each of the standby mode power signal and the active mode power signal being an AC voltage greater than zero volts, the voltage of the standby mode power signal being less than the voltage of the active mode power signal, each of the standby mode power signal and active mode power signal not being a control signal and constituting power provided to an electrical device connected to the at least one power outlet.

2. A variable power device as defined by claim 1, wherein the power control circuit includes at least one switch, the at least one switch being associated with the at least one power outlet, the at least one switch being switchable between a first state and a second state, the power control circuit selectively providing one of a standby mode power signal and an active mode power signal to the at least one power outlet in response to the at least one switch being in the first state, the power control circuit providing an active mode power signal to the at least one power outlet when the at least one switch is in the second state.

3. A variable power device as defined by claim 1, wherein the power control circuit includes an AC power adjusting circuit, the AC power adjusting circuit receiving a 120 volt AC signal and selectively providing the standby mode power signal and the active mode power signal to the at least one power outlet in response to the feedback signal from the at least one current sensing circuit.

4. A variable power device as defined by claim 3, wherein the active mode power signal is equal to about 120 volts AC, and wherein the standby mode power signal is equal to about 92 volts AC.

5. A variable power device as defined by claim 3, wherein the power control circuit includes a microprocessor, the microprocessor being electrically coupled to the AC power adjusting circuit and controlling the AC power adjusting circuit in selectively providing the standby mode power signal and the active mode power signal to the at least one power outlet.

6. A variable power device as defined by claim 5, wherein the microprocessor is responsive to the feedback signal from the at least one current sensing circuit and determining from the feedback signal a current threshold level, the microprocessor causing the AC power adjusting circuit to provide the active mode power signal to the at least one power outlet if the feedback signal corresponds to a current flowing through the at least one power outlet that is at least one of equal to and greater than the current threshold level, the microprocessor causing the AC power adjusting circuit to provide the standby mode power signal to the at least one power outlet if the feedback signal corresponds to a current flowing through the at least one power outlet that is at least one of equal to and less than the current threshold level.

7. A variable power device as defined by claim 3, wherein the AC power adjusting circuit includes an AC-to-AC converter circuit.

8. A method of providing a variable power signal to at least one power outlet to which is connectable an electrical device, which comprises the steps of:
  sensing circuit flowing through the at least one power outlet and drawn by an electrical device connected to the at least one power outlet when the electrical device is in at least a standby mode and an active mode;
  generating a feedback signal in response to the current sensed flowing through the at least one power outlet; and
  selectively providing one of a standby mode power signal and an active mode power signal to the at least one power outlet in response to the feedback signal, each of the standby mode power signal and the active mode power signal being an AC voltage greater than zero volts, the voltage of the standby mode power signal being less than the voltage of the active mode power signal, each of the standby mode power signal and active mode power signal not being a control signal and constituting power provided to an electrical device connected to the at least one power outlet.

9. A method as defined by claim 8, which further comprises the steps of:
  determining from the feedback signal a current threshold level;
  providing the active mode power signal to the at least one power outlet if the feedback signal corresponds to a current flowing through the at least one power outlet that is at least one of equal to and greater than the current threshold level; and
  providing the standby mode power signal to the at least one power outlet if the feedback signal corresponds to a current flowing through the at least one power outlet that is at least one of equal to and less than the current threshold level.

\* \* \* \* \*